United States Patent
Kitazono et al.

(10) Patent No.: US 7,906,612 B2
(45) Date of Patent: Mar. 15, 2011

(54) PLANT-DERIVED COMPONENT-CONTAINING POLYCARBONATES AND PROCESS FOR THEIR PRODUCTION

(75) Inventors: Eiichi Kitazono, Iwakuni (JP); Akimichi Oda, Iwakuni (JP); Takanori Miyoshi, Iwakuni (JP)

(73) Assignee: Teijin Limited, Osaka (JP)

( * ) Notice: Subject to any disclaimer, the term of this patent is extended or adjusted under 35 U.S.C. 154(b) by 82 days.

(21) Appl. No.: 12/439,372

(22) PCT Filed: Aug. 27, 2007

(86) PCT No.: PCT/JP2007/067080
§ 371 (c)(1),
(2), (4) Date: Feb. 27, 2009

(87) PCT Pub. No.: WO2008/029746
PCT Pub. Date: Mar. 13, 2008

(65) Prior Publication Data
US 2009/0270586 A1    Oct. 29, 2009

(30) Foreign Application Priority Data

Sep. 1, 2006   (JP) .................. 2006-237549

(51) Int. Cl.
*C08G 64/00* (2006.01)
*C08G 75/00* (2006.01)
(52) U.S. Cl. ............... 528/370; 264/176.1; 264/219; 528/196; 528/198
(58) Field of Classification Search ........... 264/176.1, 264/219; 528/196, 198
See application file for complete search history.

(56) References Cited

U.S. PATENT DOCUMENTS

| | | | |
|---|---|---|---|
| 6,339,138 B1 | 1/2002 | van Hout et al. | |
| 6,455,667 B1 | 9/2002 | Kimura et al. | |
| 2002/0103328 A1* | 8/2002 | Funakoshi et al. | 528/196 |
| 2003/0060593 A1* | 3/2003 | Funakoshi et al. | 528/196 |
| 2003/0195329 A1* | 10/2003 | Funakoshi et al. | 528/370 |
| 2006/0149024 A1 | 7/2006 | Ono et al. | |

FOREIGN PATENT DOCUMENTS

| | | |
|---|---|---|
| GB | 1079686 A | 8/1967 |
| JP | 11-349678 A | 12/1999 |
| JP | 2000-7777 A | 1/2000 |
| JP | 2000-95855 A | 4/2000 |
| JP | 2000-136238 A | 5/2000 |
| JP | 2000-178355 A | 6/2000 |
| JP | 2001-261812 A | 9/2001 |
| JP | 2001-270938 A | 10/2001 |
| JP | 2001-342248 A | 12/2001 |
| JP | 2002-308981 A | 10/2002 |
| JP | 2003-292063 A | 10/2003 |
| JP | 2003-292603 A | 10/2003 |
| JP | 2006-028441 A | 2/2006 |
| JP | 2007-146019 A | 6/2007 |
| WO | 99/54119 A1 | 10/1999 |
| WO | 2004/111106 A1 | 12/2004 |
| WO | 2007/013463 A1 | 2/2007 |
| WO | 2007/063823 A1 | 6/2007 |

* cited by examiner

*Primary Examiner* — Terressa M Boykin
(74) *Attorney, Agent, or Firm* — Sughrue Mion, PLLC

(57) ABSTRACT

The object of the invention is to provide plant-derived component-containing polycarbonates with improved color tone, and a process for their production. This object of the invention is achieved by reducing the inorganic impurities in the polymer starting material and by reducing the inorganic impurities in the polymer product.

3 Claims, No Drawings

PLANT-DERIVED COMPONENT-CONTAINING POLYCARBONATES AND PROCESS FOR THEIR PRODUCTION

TECHNICAL FIELD

The present invention relates to plant-derived component-containing polycarbonates with satisfactory color tone, to molded articles comprising the polycarbonates and to a process for production of the polycarbonates.

BACKGROUND ART

Polycarbonate resins are widely used in optical media fields, electrical, electronic and OA fields, automobile fields, industrial machine fields, medical treatment fields and other industrial fields because of their excellent transparency, heat resistance and impact resistance. However, the aromatic polycarbonates currently in wide use are produced using starting materials obtained from petroleum resources. In light of modern concerns over depletion of petroleum resources and global warming due to carbon dioxide generated by thermal disposal of waste, more environmentally friendly materials with properties similar to aromatic polycarbonates are desired.

In light of these circumstances, anhydrosugar alcohols such as dianhydrohexitols (isomannide, isoidide and isosorbide) can be obtained from the plant-derived starting materials mannitol, iditol and sorbitol, and these are being investigated as renewable resources for production of polymers and especially polyesters and polycarbonates (resources that, unlike depletable natural resources such as petroleum or coal, are themselves renewable: e.g., forest resources, biomass, wind power, small-scale water power and the like). Of these, low-cost starch has been produced as a starting material and used even as a starting material for pharmaceuticals, while polymers employing isosorbide that is commercially available are also being actively investigated (for example, see Patent documents 1-3).

Also being researched are carbonates obtained by copolymerizing glycols, used in polyester starting materials, as diol components together with isosorbide (for example, see Patent documents 4-5). This is because polycarbonates comprising only isosorbide as the diol component are associated with very high melt viscosity due to their rigid structure, rendering them less suitable for molding. Dianhydrohexitols are quite expensive as polymer starting materials, making cost a significant issue. Therefore, copolymerization of inexpensive glycols in a range that allows the necessary polymer properties to be maintained is advantageous in terms of reducing the cost of the starting material.

However, the major problem faced in the prior art is that polymers obtained using anhydrosugar alcohols such as isosorbide have poor color tone compared to ordinary polymers of petroleum crude materials, and this has been an obstacle to their commercialization and further development for use.

[Patent document 1] British Patent No. 1,079,686
[Patent document 2] International Patent Publication No. 1999/054119
[Patent document 3] International Patent Publication No. 2007/013463
[Patent document 4] International Patent Publication No. 2004/111106
[Patent document 5] Japanese Unexamined Patent Publication No. 2003-292603

DISCLOSURE OF THE INVENTION

Problems to be Solved by the Invention

It is an object of the present invention to provide a plant-derived component-containing polycarbonates with improved color tone, molded articles comprising the polycarbonates and a process for production of the polycarbonates.

Means for Solving the Problems

As a result of much diligent research directed toward solving the problems mentioned above, the present inventors have discovered that they can be solved by reducing the inorganic impurities in the polymer starting material and by reducing the inorganic impurities in the polymer product, and the invention has thereupon been completed. The construction of the invention is as follows.

1. A polycarbonate represented by the following formula (1):

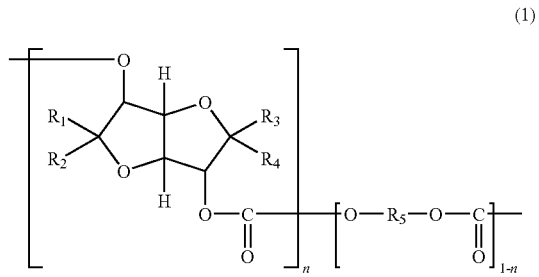

(where $R_1$-$R_4$ each independently represent a group selected from among hydrogen, alkyl, cycloalkyl and aryl groups, $R_5$ is a C2-12 aliphatic group and n is such that $0.6 \leq n \leq 0.9$), wherein the inorganic impurity content of the polymer is no greater than 10 ppm as the value measured using an ICP (inductively coupled plasma) atomic emission analyzer, and the Col-b value is no greater than 5.

2. A polycarbonate according to 1. above, wherein the inorganic impurity consists of one or more selected from the group consisting of Na, Ca and Fe.

3. A molded article comprising a polycarbonate according to 1. or 2. above.

4. A process for production of a polycarbonate according to 1. or 2. above by a melt polycondensation process that employs as the starting materials:

a diol having a total inorganic impurity content of no greater than 2 ppm as the value measured using an ICP (inductively coupled plasma) atomic emission analyzer and a purity analysis value of at least 99.7% by gas chromatography, and being represented by the following formula (2):

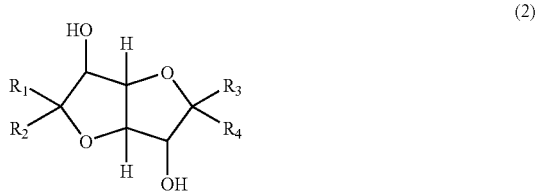

(where $R_1$-$R_4$ each independently represent a group selected from among hydrogen, alkyl, cycloalkyl and aryl groups), and a diol having a total inorganic impurity content of no greater than 2 ppm as the value measured using an ICP (inductively coupled plasma) atomic emission analyzer and a purity analysis value of at least 99.7% by gas chromatography, and being represented by the following formula (3):

(where $R_5$ is a C2-12 aliphatic group), as diol components, with a carbonic acid diester having a total inorganic impurity content of no greater than 2 ppm as the value measured using an ICP (inductively coupled plasma) atomic emission analyzer and a purity analysis value of at least 99.7% by gas chromatography, and being represented by the following formula (4):

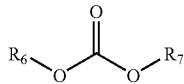

(where $R_6$ and $R_7$ are groups selected from among alkyl, cycloalkyl and aryl groups, $R_6$ and $R_7$ being either identical or different groups).

Effect of the Invention

According to the invention it is possible to provide plant-derived component-containing polycarbonates with improved coloration, molded articles comprising the polycarbonates and a process for production of the polycarbonates.

Because the polycarbonates of the invention are composed of plant-derived components which are renewable resources and thus have a reduced environmental load, while also exhibiting highly satisfactory color tone, they are potentially useful for a variety of purposes.

BEST MODE FOR CARRYING OUT THE INVENTION

The present invention will now be explained in greater detail. Unless otherwise specified, the numerical values for ppm and % are based on weight.

A polycarbonate of the invention is represented by formula (1) above, and the content of inorganic impurities in the polymer, and especially the total of Na, Ca and Fe, is no greater than 10 ppm, more preferably no greater than 7 ppm and most preferably no greater than 3 ppm as the value measured using an ICP (inductively coupled plasma) atomic emission analyzer. The inorganic impurity content is preferably not above this range, because coloration will become notable and the molten stability and hydrolysis resistance will be impaired. Na, Ca and Fe constitute most of the inorganic impurities in polymers because they tend to appear as contaminants from the production facility and other materials and from the external air, and because their contents are somewhat high in commercially available diols of formula (2) above. Methods for limiting the amount of inorganic impurities in the polymer to the range specified above include using starting materials with low inorganic impurity contents, limiting the amount of catalyst used, and carrying out production with equipment made of materials that are resistant to elution of such components. Although a smaller inorganic impurity content of the polymer is preferred, attempts to achieve a content of 0 ppm may greatly increase cost for contaminant reduction and lower production efficiency. The lower limit for the inorganic impurity content in the polymer which allows consistent productivity is about 3 ppm.

The inorganic impurity content according to the invention is the value determined using an ICP (inductively coupled plasma) atomic emission analyzer. An ICP emission analyzer accomplishes emission spectroscopic analysis using high-frequency inductively coupled plasma as the excitation source, whereby upon introduction of an atomized sample solution into high temperature argon plasma and analysis of the emission spectrum lines with a diffraction grating, it allows qualitative and quantitative analysis of elements based on wavelength and intensity of the spectral lines, and it is especially suitable for simultaneous multi-element analysis. The method is said to allow analysis of up to 72 types of elements, excluding hydrogen, rare gases, nitrogen, oxygen, fluorine, chlorine, bromine, and radioactive isotopes that are not stable isotopes. According to the invention, therefore, the inorganic impurity content is the quantified value for elements other than carbon, hydrogen and oxygen, i.e. elements composing polycarbonates, by ICP emission analysis.

The polycarbonate of the invention is also a polycarbonate with Col-b value of no greater than 5 and preferably no greater than 3.

The polycarbonate of the invention preferably has a reduced viscosity of 0.5-1.0 dL/g and more preferably 0.6-0.8 dL/g. A reduced viscosity of less than 0.50 dL/g may result in insufficient mechanical strength of molded articles obtained from the polycarbonate of the invention. A reduced viscosity of higher than 1.0 dL/g will tend to result in an excessively high melt flow temperature, such that the melting temperature at which the flow property necessary for molding is exhibited will be higher than the decomposition temperature.

According to the invention, n in formula (1) is such that $0.6 \leq n \leq 0.9$. If n is less than 0.6, the glass transition temperature and heat resistance of the obtained resin will be undesirably reduced. If it is greater than 0.9, the melt flow temperature will be too high, making it difficult to ensure a flow property necessary for molding.

The polycarbonate of the invention can be used for a wide variety of purposes including optical media, electrical, electronic and OA devices, automobile and industrial machinery parts, medical and safety equipment, sheets, films, packagings and general merchandise. Specifically, there may be mentioned optical media such as DVD, CD-ROM, CD-R and minidisks, electrical, electronic and OA devices such as cellular phones, personal computer housings, battery pack cases, liquid crystal parts and connectors, automobile and industrial machinery parts such as headlamps, inner lenses, door handles, bumpers, fenders, roof rails, instrument panels, clusters, console boxes, cameras and power tools, medical and safety equipment such as carports, liquid crystal diffusion/reflective films and potable water tanks, and general merchandise such as pachinko parts, fire extinguisher cases and the like.

The method for molding the polycarbonate to obtain molded articles for the purposes mentioned above according to the invention may be injection molding, compression molding, injection compression molding, extrusion molding, blow molding or the like. The method of producing a film or sheet may be, for example, solvent casting, melt extrusion, calendering or the like.

The plant-derived diol component used for the invention is represented by formula (2) above, and specifically it is a dianhydrohexitol. As dianhydrohexitols there may be mentioned 1,4:3,6-dianhydro-D-mannitol (abbreviated as "isomannide" hereafter throughout the present specification), 1,4:3,6-dianhydro-L-iditol (abbreviated as "isoidide" hereafter throughout the present specification) and 1,4:3,6-dianhydro-D-sorbitol (abbreviated as "isosorbide" hereafter throughout the present specification) (formulas (5), (6) and (7) below). These dianhydrohexitols are substances obtained from natural biomass, and are renewable resources. Isosorbide can be obtained by adding water to D-glucose from starch and then subjecting it to dehydration. Other dianhydrohexitols can also be obtained by similar reactions with different starting materials. Isosorbide is a diol that is easily produced from starch as an abundantly available source, while it is easier to produce than isomannide or isoidide.

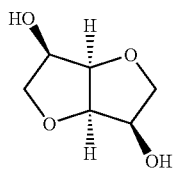
(5)

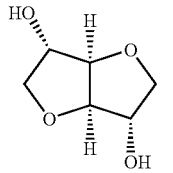
(6)

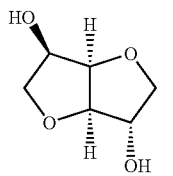
(7)

The diol component to be copolymerized therewith is represented by formula (3) (hereinafter, the diol of formula (3) will be referred to as "glycol"), and there may be mentioned ethylene glycol, propylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,4-cyclohexanediol, 1,4-cyclohexanedimethanol and neopentyl glycol. Preferred among these, from the standpoint of high polymerizability for polymer synthesis and a high glass transition point as a physical property of the polymer, are 1,3-propanediol (hereinafter abbreviated as 1,3-PDO), 1,4-butanediol (hereinafter abbreviated as 1,4-BDO) and 1,6-hexanediol (hereinafter abbreviated ad 1,6-HDO), while 1,3-propanediol is particularly preferred because it can also be obtained from plant materials, and when copolymerized exhibits a powerful improving effect on the melt flow property. Also, two or more diol components of formula (3) may be used in combination.

There are no particular restrictions on the method of purifying the diols used for the invention. Simple distillation, rectification or recrystallization is preferred, or optionally a combination of these methods may be employed for purification. However, commercial diol products often contain stabilizers or degradation products from storage that can adversely affect polymer quality. This becomes particularly notable in the case of plant-derived diols of formula (2). When such diols are used to obtain polymers, it is preferred for them to be re-purified and immediately used for polymerization reaction. When a certain period of storage after purification is unavoidable, they are preferably stored in a dry environment at a low temperature of below 40° C., shielded from light and in an inert atmosphere.

The diol components of formula (2) and formula (3) that are used for the invention have an organic impurity content of no greater than 0.3%, preferably no greater than 0.1% and even more preferably no greater than 0.05% of the total, as detected by gas chromatography. The inorganic impurity content, and especially the total content of Na, Fe and Ca as detected by ICP emission analysis is no greater than 2 ppm and preferably no greater than 1 ppm.

The carbonic acid diester used for the invention is represented by the following formula (4), and as examples there may be mentioned aromatic carbonic acid diesters such as diphenyl carbonate, ditolyl carbonate, dixylyl carbonate, bis(ethylphenyl)carbonate, bis(methoxyphenyl)carbonate, bis(ethoxyphenyl)carbonate, dinaphthyl carbonate and bis(biphenyl)carbonate, and aliphatic carbonic acid diesters such as dimethyl carbonate, diethyl carbonate and dibutyl carbonate. From the standpoint of reactivity and cost, aromatic carbonic acid diesters are preferred among these compounds, with diphenyl carbonate being even more preferred.

There are no particular restrictions on the method of purifying the carbonic acid diester used for the invention. Simple distillation, rectification or recrystallization is preferred, or a combination of these methods may be employed for purification.

The carbonic acid diester that is used for the invention has an organic impurity content of no greater than 0.3%, preferably no greater than 0.1% and even more preferably no greater than 0.05% of the total, as detected by gas chromatography. The inorganic impurity content, and especially the total content of Na, Fe and Ca as detected by ICP emission analysis is no greater than 2 ppm and preferably no greater than 1 ppm.

As known processes for production of polycarbonate resins there may be mentioned the phosgene process wherein essentially an aqueous alkali solution of a dihydroxy compound is reacted with phosgene in the presence of an organic solvent, and the melt polycondensation process wherein a dihydroxy compound and a carbonic acid diester are subjected to melt polycondensation reaction at high temperature and high vacuum in the presence of a transesterification catalyst. Although the melt polycondensation process requires a transesterification catalyst as well as high temperature and high vacuum, it is more economical than the phosgene process and is also advantageous in that polycarbonate resins with substantially no chlorine can be obtained. According to the invention as well, the polycarbonate is preferably produced by the melt polycondensation process.

In the production process of the invention, a polycarbonate of formula (1) above is produced by, preferably, a melt polycondensation process from diols represented by formula (2) and (3) above and a carbonic acid diester represented by formula (4) above.

For melt polymerization to obtain a polycarbonate of the invention, the carbonic acid diester is preferably used in an amount of 0.90-1.30 mol and more preferably 0.99-1.05 mol with respect to 1 mol of the diol component.

A catalyst is preferably used for the production process of the invention. As catalysts to be used there may be mentioned compounds with the ability to catalyze transesterification or esterification reaction, including alkoxides or phenoxides of alkali metals, alkoxides or phenoxides of alkaline earth metals, nitrogen-containing basic compounds, quaternary ammonium salts, organic acid salts of alkali metals or alkaline earth metals, boron compounds, aluminum compounds, zinc compounds, boron compounds, silicon compounds, titanium compounds, organic tin compounds, lead compounds, osmium compounds, antimony compounds, zirconium compounds, manganese compounds and the like, although preferred are (i) nitrogen-containing basic compounds, (ii) alkali metal compounds and (iii) alkaline earth metal compounds from the standpoint of reactivity, effects on molded article quality, cost, and health. These may be used alone or two or more may be used in combinations, among which combinations of (i) and (ii), (i) and (iii) and (i), (ii) and (iii) are particularly preferred.

Tetramethylammonium hydroxide is preferred for (i) and sodium salts are preferred for (ii), among which 2,2-bis(4-hydroxyphenyl)propane disodium salt is most preferred for use.

The nitrogen-containing basic compound of (i) above preferably has a proportion of basic nitrogen atoms that is $1\times10^{-5}$ to $1\times10^{-3}$ mol and more preferably $2\times10^{-5}$ to $8\times10^{-4}$ mol with respect to 1 mol of the diol compounds.

For the (ii) alkali metal compound and (iii) alkaline earth metal compound as catalysts, the total of alkali metal elements and alkaline earth metal elements added is preferably in the range of 0 to $1\times10^{-5}$ mol and more preferably in the range of 0 to $5\times10^{-6}$ mol per mole of the starting diol compounds.

In the production process of the invention, preferably the diol and carbonic acid diester starting materials are heated at ordinary pressure in the presence of a polymerization catalyst for pre-reaction, after which they are stirred while heating at a temperature of no higher than 280° C. under reduced pressure to run off the phenols and alcohols. The reaction system is preferably maintained in an atmosphere of a gas that is inert with respect to the starting materials and reaction mixture, such as nitrogen. Argon may be mentioned as an inert gas other than nitrogen.

Thermal reaction is preferably conducted at ordinary pressure at the initial stage. This will promote the oligomerization reaction and, during the reduced pressure in the later stage for run off of the phenols and alcohols, will prevent run off of the unreacted monomer that results in molar imbalance and a reduced polymerization degree. In the production process of the invention, appropriate removal of the phenols and alcohols from the system (reactor) can help promote the reaction. Reduced pressure is therefore effective, and is preferred.

For the production process of the invention, a minimally low temperature condition is preferred to inhibit diol decomposition and obtain a resin with low coloration and high viscosity, but to suitably promote the polymerization reaction, the conditions are such that the maximum polymerization temperature is preferably in the range of between 180° C. and 280° C. and more preferably 230-260° C.

EXAMPLES

The present invention will now be explained in greater detail by examples, with the understanding that the invention is in no way restricted by the examples.

The isosorbide used in the examples was by Roquette or Sanko Co., Ltd., the diphenyl carbonate was by Teijin Chemicals, Ltd. and the 1,3-propanediol, 1,4-butanediol, 1,6-hexanediol, phenol and tetrachloroethane were by Wako Pure Chemical Industries, Ltd.

(1) The amounts of isosorbide and diphenyl carbonate and polymer inorganic impurities were quantified using a Varian MP-X (multi-type) ICP atomic emission analyzer.

(2) The isosorbide and diphenyl carbonate purity was measured by gas chromatography (GC-14B by Shimadzu Corp.). The measuring conditions were: a column temperature of 220° C., an injection temperature of 280° C., a detection temperature of 280° C., carrier gas: (He: 120 kPa (1.63 ml/min), Split: 30.9 ml/min, Purge: 30 ml/min), and Make up: ($N_2$: 40 ml/min, $H_2$×air: 70×70 kPa). A sample solution (5% acetone solution) was prepared and 1 μl was injected for measurement.

(3) The reduced viscosity of the polymer was determined as the 35° C. viscosity of a solution obtained by dissolving 120 mg of polycarbonate in 10 ml of a phenol/tetrachloroethane (volume ratio: 50/50) mixed solvent, using an Ubbelohde viscometer.

(4) The color tone of the polymer was determined by measuring the Col-b value using a UV-VIS Recording Spectrophotometer (Shimadzu Corp.), according to JIS Z 8722. The measurement was conducted by adding and dissolving 4 ml of methylene chloride in 0.935 g of the polymer, and determining the Col-b value under conditions with a wavelength of 780-380 nm, an illumination of C and a field of view of 20.

Example 1

Isosorbide (Roquette) was subjected once to simple distillation. In a three-necked flask there were placed the isosorbide (23.38 g, 0.16 mol), 1,3-propanediol (3.043 g, 0.04 mol) and diphenyl carbonate (42.84 g, 0.2 mol) and then 2,2-bis(4-hydroxyphenyl)propane disodium salt (2.723 μg, $1.0\times10^{-8}$ mol) and tetramethylammonium hydroxide (0.3646 mg, $4.0\times10^{-6}$ mol) were added as polymerization catalyst and the mixture was melted at 180° C. under a nitrogen atmosphere. The reaction tank interior was then reduced in pressure to 100 mmHg (13.33 kPa) while stirring, and reaction was conducted for approximately 20 minutes while distilling off the produced phenol. After subsequent temperature increase to 200° C., the pressure was reduced to 30 mmHg (4.00 kPa) while distilling off the phenol, followed by further temperature increase to 215° C. Next, the pressure was gradually reduced and reaction was continued for 10 minutes at 20 mmHg (2.67 kPa) and for 10 minutes at 10 mmHg (1.33 kpa), and after temperature increase to 230° C., reaction was conducted with further pressure reduction and temperature increase to final conditions of 250° C., 0.5 mmHg (0.067 kPa). This was defined as 0 minutes, and after 10 minutes a sample was taken and the reduced viscosity, inorganic impurity content and Col-b value were measured. An injection molding machine (PS-type injection molding machine, PS20 by Nissei Plastic Industrial Co., Ltd.) was used for molding of a test strip with 3 mm thickness×12.5 mm width×63 mm length at a cylinder temperature of 250° C. and a mold temperature of 80° C., and the outer appearance thereof was visually confirmed. The results are shown in Table 1.

Example 2

The same procedure was carried out as in Example 1, except that the same number of moles of 1,4-butanediol was used instead of 1,3-propanediol. The results are shown in Table 1.

Example 3

The same procedure was carried out as in Example 1, except that the same number of moles of 1,6-hexanediol was used instead of 1,3-propanediol. The results are shown in Table 1.

Comparative Example 1

The same procedure was carried out as in Example 1, except that distillation and purification of isosorbide was not carried out. The results are shown in Table 1.

Comparative Example 2

The same procedure was carried out as in Example 1, except that isosorbide (product of Sanko Chemical Industry Co., Ltd.) was used directly without distillation. The results are shown in Table 1.

TABLE 1

| | Diol components | | | | | | Polymer | | | |
|---|---|---|---|---|---|---|---|---|---|---|
| | Isosorbide | | Glycol | | Diphenyl carbonate | | | | | |
| | Detected inorganic impurities, and content[1] (ppm) | Purity[2] (wt %) | Detected inorganic impurities, and content[1] (ppm) | Purity[2] (wt %) | Detected inorganic impurities, and content[1] (ppm) | Purity[2] (wt %) | Detected inorganic impurities, and content[1] (ppm) | Reduced viscosity (dL/g) | Color tone (Col-b) | Molded article Appearance (visual) |
| Example 1 | Na, Fe, Ca Total: 0.2 | 99.9 | Na, Fe, Ca Total: 0.1 | 1,3-PDO 99.9 | Na, Fe, Ca Total: 0.4 | 99.9 | Na, Fe, Ca Total: 3.1 | 0.55 | 0.47 | Good |
| Example 2 | Na, Fe, Ca Total: 0.6 | 99.9 | Na, Fe, Ca Total: 0.5 | 1,4-BDO 99.9 | Na, Fe, Ca Total: 0.4 | 99.9 | Na, Fe, Ca Total: 7.0 | 0.74 | 0.90 | Good |
| Example 3 | Na, Fe, Ca Total: 0.6 | 99.9 | Na, Fe, Ca Total: 0.4 | 1,6-HDO 99.9 | Na, Fe, Ca Total: 0.4 | 99.9 | Na, Fe, Ca Total: 8.8 | 0.70 | 1.00 | Good |
| Comp. Ex. 1 | Na, Fe, Ca Total: 10.0 | 99.9 | Na, Fe, Ca Total: 0.8 | 1,3-PDO 99.9 | Na, Fe, Ca Total: 0.4 | 99.9 | Na, Fe, Ca Total: 10.5 | 0.37 | 7.93 | Yellowish |
| Comp. Ex. 2 | Na, Fe, Ca Total: 59.2 | 97.8 | Na, Fe, Ca Total: 0.8 | 1,3-PDO 99.9 | Na, Fe, Ca Total: 0.4 | 99.9 | Na, Fe, Ca Total: 51.8 | 0.38 | 42.49 | Yellowish |

[1] The amounts of inorganic impurities were quantified using the ICP atomic emission analyzer.
[2] The purity was measured by gas chromatography.

What is claimed is:

1. A polycarbonate represented by the following formula (1):

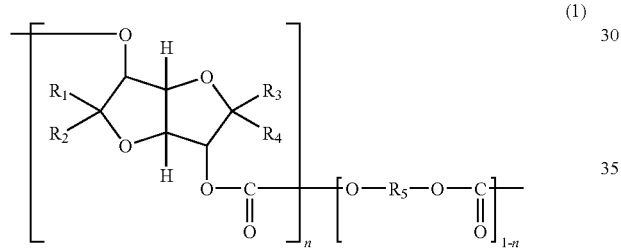

(where $R_1$-$R_4$ each independently represent a group selected from among hydrogen, alkyl, cycloalkyl and aryl groups, $R_5$ is a C2-12 aliphatic group and n is such that $0.6 \leq n \leq 0.9$), wherein total content of Na, Ca and Fe of the polymer is no greater than 10 ppm as the value measured using an ICP (inductively coupled plasma) atomic emission analyzer, and the Col-b value is no greater than 5.

2. A molded article comprising a polycarbonate according to claim 1.

3. A process for production of a polycarbonate according to claim 1 by a melt polycondensation process that employs as the starting materials:

a diol having a total content of Na, Ca and Fe of no greater than 2 ppm as the value measured using an ICP (inductively coupled plasma) atomic emission analyzer and a purity analysis value of at least 99.7% by gas chromatography, and being represented by the following formula (2):

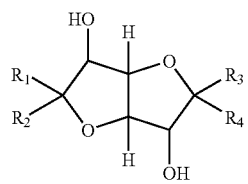

(where $R_1$-$R_4$ each independently represent a group selected from among hydrogen, alkyl, cycloalkyl and aryl groups), and a diol having a total content of Na, Ca and Fe of no greater than 2 ppm as the value measured using an ICP (inductively coupled plasma) atomic emission analyzer and a purity analysis value of at least 99.7% by gas chromatography, and being represented by the following formula (3):

(where $R_5$ is a C2-12 aliphatic group), as diol components, with a carbonic acid diester having a total content of Na, Ca and Fe of no greater than 2 ppm as the value measured using an ICP (inductively coupled plasma) atomic emission analyzer and a purity analysis value of at least 99.7% by gas chromatography, and being represented by the following formula (4):

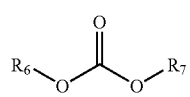

(where $R_6$ and $R_7$ are groups selected from among alkyl, cycloalkyl and aryl groups, $R_6$ and $R_7$ being either identical or different groups).

* * * * *